(12) United States Patent
Goldman (10) Patent No.: US 8,667,390 B2
(45) Date of Patent: Mar. 4, 2014

(54) ASYNCHRONOUS ACCESS TO STRUCTURED DATA

(75) Inventor: Oliver Goldman, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 621 days.

(21) Appl. No.: 12/243,907

(22) Filed: Oct. 1, 2008

(65) Prior Publication Data

US 2013/0167004 A1    Jun. 27, 2013

Related U.S. Application Data

(63) Continuation of application No. 10/107,226, filed on Mar. 25, 2002, now abandoned.

(51) Int. Cl.
*G06F 3/00* (2006.01)
(52) U.S. Cl.
USPC .......................................................... 715/237
(58) Field of Classification Search
USPC .......................................... 715/234, 243, 254
See application file for complete search history.

(56) References Cited

U.S. PATENT DOCUMENTS

| | | | |
|---|---|---|---|
| 5,845,305 A | 12/1998 | Kujiraoka | |
| 6,073,144 A | 6/2000 | Van Hoff | |
| 6,101,512 A | 8/2000 | DeRose et al. | |
| 6,339,780 B1 | 1/2002 | Shell et al. | |
| 6,418,403 B2 | 7/2002 | Fuji | |
| 6,571,253 B1 | 5/2003 | Thompson | |
| 6,584,459 B1 | 6/2003 | Chang et al. | |
| 6,631,379 B2 | 10/2003 | Cox | |
| 6,643,653 B1 | 11/2003 | Chu | |
| 6,654,761 B2 | 11/2003 | Tenev et al. | |
| 7,019,864 B2 | 3/2006 | Delhoune | |
| 2001/0049675 A1 | 12/2001 | Mandler et al. | |
| 2002/0062311 A1 | 5/2002 | Kircher | |
| 2002/0099745 A1 | 7/2002 | Huck et al. | |
| 2003/0066033 A1 | 4/2003 | Direen et al. | |
| 2003/0101169 A1 | 5/2003 | Bhatt et al. | |

(Continued)

FOREIGN PATENT DOCUMENTS

WO    WO9414122    6/1994

OTHER PUBLICATIONS

Ray, Erik T., "Learning XML," Jan. 1, 2011, O'Reilly Media, Inc., pp. 275-278.*

(Continued)

*Primary Examiner* — Kyle Stork
(74) *Attorney, Agent, or Firm* — Wolfe-SBMC (57) ABSTRACT

Methods and apparatus implementing systems and techniques for asynchronously loading and accessing structured data. A random access interface can be provided to structured data while that structured data is asynchronously and simultaneously being loaded from a data source. A document, such as an Extensible Markup Language document, can be sequentially parsed and loaded into memory, and a tree data structure interface to the entire document can be provided to a client before the entire document has been fully parsed. In general, in one implementation, the technique includes: parsing structured data in sequence to produce a data object model representing at least a portion of the structured data in a memory, and simultaneously providing, to a client, read and write random access to the structured data through the data object model in the memory as the data object model is being produced.

25 Claims, 4 Drawing Sheets

(56) References Cited

U.S. PATENT DOCUMENTS

| | | | |
|---|---|---|---|
| 2004/0015840 A1 | 1/2004 | Walker | |
| 2004/0205549 A1 | 10/2004 | Yassin et al. | |
| 2004/0205552 A1 | 10/2004 | Vosburgh | |

OTHER PUBLICATIONS

Augusti, "Parsing and DOM-Tree Building with JavaScript", Apr. 13, 2001, <http://www.oreillynet.com/lpt/a/766>, pp. 1-5.

Brownell, "Top Ten SAX2 Tips", Dec. 5, 2001, <http://www.xml/corn/lpt/a/2001/12/05/sax2.html>, pp. 1-13.

Chappell, et al. "Benchmarking JMS-Based E-Business Messaging Providers", Mar. 1, 2001, <http://www.syscon.com/story/?storyid=36219&DE=1>, pp. 1-13.

Clark, "DOM and SAX are Dead, Long Live DOM and SAX", Nov. 14, 2001, <http://www.xml.com/lpt/a/2001/11/14/dom-sax.html>, pp. 1-7.

"Document Object Model (DOM) Level 3 Abstract Schemas and Load and Save Specifications," www.w3.org/TR/DOM-Level-3-ASLS Version 1, W3C Working Draft, Jan. 14, 2002.

"Document Object Model Load and Save," Oct. 25, 2001, www.w3.org/TR/2001/WD-DOM-Level-3-ASLS-20011025/load-save.html.

Dodds, "Storing and Querying", Apr. 5, 2000, <http://www.xml.com/lpt/a/2000/04/05/deviant/index.html >, pp. 1-4.

Dumbill, "Quilt Has Querying Covered", Jun. 13, 2002, <http://www.xml.com/lpt/a/2000/06/xmleurope/quilt.html>, pp. 1-3.

Euzenat, et al. "XML Transformation Flow Processing", 2001, <http://www.transmorpher.inrialpes.fr/wpaper/>, pp. 1-20.

Hampton, "High Performance XML Parsing with SAX", Feb. 14, 2001, <http://www.xml.com/lpt/a/2001/02/14/perlsax.html >, pp. 1-6.

Hors, et al. "Document Object Model Core", Nov. 13, 2000, <http://www.w3.org/TR/DOM-Level-2-Core/core.html>, pp. 1-71.

"Howto: Retrieve XML Data Asynchronously with ondataavailable Event (Q285874)," http://support.microsoft.com/default.aspx?scid=kb:EN-US:q285874, Feb. 28, 2002.

Idris, "Should I Use SAX or DOM?", May 22, 1999, <http://developerlife.com/saxvsdom/default.html>, pp. 1-5.

"Microsoft XML Core Services (MSXML) 4.0—DOM Reference, readyState Property (DOMDocuments)," http://msdn.microsoft.com/library/en-us/xmlsdk/htm/xml_pro_pr_2rlw.asp?frame=true, Dec. 20, 2001.

Microsoft XML Core Services (MSXML) 4.0—DOM Reference, getAttribute Method, http://msdn.microsoft.com/library/en-us/xmlsdk/htm/xml_mth_dg_5rfo.asp?frame=true, Dec. 20, 2001.

Microsoft XML Core Services (MSXML) 4.0—DOM Developer's Guide, Getting and Setting Parse Flags, http://msdn.microsoft.com/library/en-us/xmlsdk/htm/dom_howdoi_58ab.asp?frame=true, Dec. 20, 2001.

"Perl XML Quickstart: The Standard XML Interfaces", May 16, 2001, <http://www.xml.corn/lpt/a/2001/05/16/perlxml.html>, pp. 1-6.

U.S. Appl. No. 60/318,956, filed Sep. 13, 2001.

Rodriguez, "Processing XML with Perl", Apr. 5, 2000, <http://www.xml.com/lpt/a/2000/04/05/feature/index.html>, pp. 1-9.

"Sax-Like Event Handlers for the Generic Parsing of ASN.1 Encoded Data", Feb. 2001, Objective Systems, Inc., pp. 1-9.

"Scripts" (in HTML documents), www.w3.org/TR/html4/interact/scripts.html, Feb. 28, 2002.

Sedgewick, "Algorithms in C", 1998, Addison-Wesley, 3$^{rd}$ Edition, pp. 105-108.

"The Collected Works of SAX", Jul. 18, 2001, <http://www.xml.com/lpt/a/2001/07/18/collectedsax.html>, pp. 1-4.

"Two-Part Addresses and Memory Segmentation", Aug. 7, 2001, <http://web.archive.org/web/20010807224345/http://homepage.sme.edu/morgan_david/cs40/segmentation.htm>, pp. 1-5.

"Unicode in XML and other Markup Languages: Unicode Technical Report #20", Feb. 18, 2002, <http://www.w3.org/TR/2002/NOTE-unicode-xml-20020218/>, pp. 1-33.

Walsh, "Getting Started with XML Programming, Part II", May 5, 1999, <http://www.xml.com/lpt/a/norm/part2/getstart2.html>, pp. 1-8.

"Writing SAX Drivers for Non-XML Data", Sep. 19, 2001, <http://www.xml.com/lpt/a/2001/09/19/sax-non-xml-data.html>, pp. 1-9.

"Advisory Action", U.S. Appl. No. 10/107,226, (Mar. 27, 2006), 3 pages.

"Data Conversion Laboratory", retrieved from <http://www.dclab.com/DCLTP.ASP?FN=glossary> on Dec. 15, 2006, 6 pages.

"Examiner's Answer to Appeal", U.S. Appl. No. 10/107,226, (Dec. 20, 2006), 23 pages.

"Examiner's Answer to Appeal", U.S. Appl. No. 10/107,226, (Aug. 23, 2006), 23 pages.

"Final Office Action", U.S. Appl. No. 10/107,226, (Dec. 15, 2005), 20 pages.

"Non-Final Office Action", U.S. Appl. No. 10/107,226, (Jan. 12, 2005), 21 pages.

"Non-Final Office Action", U.S. Appl. No. 10/107,226, (Jul. 14, 2005), 18 pages.

"Notice of Panel Decision from Pre-Appeal Brief Review", U.S. Appl. No. 10/107,226, (May 4, 2006), 2 pages.

"Patent Board Appeal Decision", U.S. Appl. No. 10/107,226, (Aug. 1, 2008), 29 pages.

\* cited by examiner

ASYNCHRONOUS ACCESS TO STRUCTURED DATA

CROSS-REFERENCE TO RELATED APPLICATIONS

This application is a continuation application of and claims priority to U.S. application Ser. No. 10/107,226, filed on Mar. 25, 2002.

BACKGROUND

The present invention relates to loading and accessing structured data in electronic documents.

Typical document access is synchronized with document loading. Thus, access to a full document is not provided until the document has been fully loaded into memory, or access to portions of the document is provided by loading specific portions upon request. Variations on this traditional approach also have been implemented. For example, asynchronous loading of a document allows a client process to initiate loading of a document into memory, and then proceed to other tasks before coming back to access the fully loaded document. Additionally, in some traditional systems, a producer process and a consumer process can work together in sequence on a document that is being loaded into memory; the consumer is provided sequential access to the document in memory, as the document is loaded.

A document can be represented and stored in many different formats. Common formats include those defined by markup languages. For example, SGML (Standard Generalized Markup Language) defines a general grammar for descriptive markup of Unicode or ASCII (American Standard Code for Information Interchange) text, where angle brackets are used to specify tags defining the semantic value of data. In the context of the World Wide Web (Web), HTML (Hypertext Markup Language) is a markup language, which is derived from SGML, that is commonly used to define how linked electronic documents should look when presented as pages on a display device or when printed.

HTML generally describes how data should be displayed and mixes data semantics with data presentation information. XML (Extensible Markup Language) describes information, generally addressing data semantics while ignoring issues of presentation and formatting, which are left to XHTML (Extensible HTML) documents. XML documents are extensible; the underlying grammar is defined by the World Wide Web Consortium (W3C), but the tags can be defined by users of XML.

XML documents can be accessed using defined Application Program Interfaces (APIs). For example, the SAX (Simple API for XML) API is an event-based interface designed for linear access to XML documents. A parsing process (parser/producer) parses an XML document and provides a client process (consumer) with a stream of events as the producer parses the XML document. In contrast, DOM (Document Object Model) API is an interface designed for random access to XML documents. A producer parses an XML document and, once parsing is complete, provides a client with read-write random access to a logical tree data structure (the DOM) representing the XML document.

The documentElement is the top-level (root) of the tree, and this element has one or more childNodes (tree branches). A Node Interface Model is used to access the individual elements in the node tree. As an example, the childNodes property of the documentElement can be accessed with a for/each construct to enumerate each individual node. The Node Interface Model is defined by W3C and includes definitions of the functions needed to traverse the node tree, access the nodes and their attribute values, insert and delete nodes, and convert the node tree back to XML.

SUMMARY

A random access interface can be provided to structured data while that structured data is asynchronously and simultaneously being loaded from a data source (e.g., a file on disk, or a network connection). A document, such as an Extensible Markup Language document, can be parsed and loaded into memory, and a tree data structure interface to the entire document can be provided to a client before the entire document has been fully parsed.

In one aspect, a method includes parsing structured data to produce a data object model representing at least a portion of the structured data in a memory, and simultaneously providing, to a client, read and write random access to the structured data through the data object model in the memory as the data object model is being produced. The method can further include receiving from the client a request to access a portion of the structured data, and in response to the request, providing to the client the requested access to the portion of the structured data through the data object model in the memory, after additional parsing if the portion of the structured data is not in the memory when the request is received. The method can also include receiving a notification, before completion of data parsing, that no further access to a portion of the structured data is to be requested by the client, and removing a portion of the data object model, corresponding to the portion of the structured data, from the memory in response to the notification.

Parsing of the structured data and providing the random access can be performed in one or more threads of a process that includes an additional one or more threads effecting the client. Alternatively, parsing of the structured data and providing the random access can be performed by two threads of a first process separate from a second process effecting the client. For example, the first process and the second process can be running in separate machines.

In another aspect, a system includes a parsing component to process structured data and load the structured data into a memory, and a parsing-state aware data interface component to provide parsing-state independent random access to the structured data in the memory. The parsing-state aware data interface component can provide discarding services to remove one or more portions of the structured data from the memory in response to a notification that no further access to the portion of the structured data is to be requested.

The structured data can be received over a network, or read from a file on a machine-readable medium. The structured data can be text-based linearized tree data, such as XML data, which can include characters encoded in Unicode. The data object model can be a document object model representing a tree data structure, such as DOM defined by the W3C.

In another aspect, a method includes serially parsing text-based linearized tree data to produce a tree data structure having nodes, receiving an access request for one of the nodes, while the parsing continues, the one of the nodes corresponding to a portion of the text-based linearized tree data that has not been parsed, and providing, in response to the request, access to the requested node once the portion of the text-based linearized tree data has been parsed. The method can involve determining if a requested node to be accessed has been parsed in response to an access request received while the parsing continues, and providing the requested access to the requested node once the text-based linearized tree data corresponding to the requested node has been parsed. The node access can be provided through a document object model interface, such as DOM defined by W3C, while the data is being streamed between threads, processes or machines. The method can further include receiving a notification, before parsing of the text-based linearized tree data is complete, that no further access to a portion of the text-based linearized tree data is to be requested, and then deleting a portion of the tree data structure corresponding to the notification portion of the text-based linearized tree data in response to the received notification.

The text-based linearized tree data can be obtained from a network, or read from a file on a machine-readable medium. The text-based linearized tree data can include text-based formatting information that conforms to rules defined by a metalanguage, such as XML, and can include characters encoded in Unicode. The text-based linearized tree data can include data and tags defining semantic value for the data, the tags including element tags and attribute tags. The requested access to the requested node can be a node query request or a node modification request, including insertion and deletion of nodes or write calls to transfer nodes from memory to text-based linearized tree data.

Implementations of the systems and techniques described here can occur in hardware, software or a combination of both, and can include machine instructions for causing a machine to perform the operations described. For example, the methods can be implemented in a system that includes a processor, a persistent storage area coupled with the processor, a volatile memory coupled with the processor, an input-output interface coupled with the processor, and an execution area configured to perform operations implementing the method(s).

The invention can be implemented to realize one or more of the following advantages. The systems and techniques described can result in efficient access to documents, particularly large documents such as large XML documents. A document can be accessed, including initial portions of the document, using a random access interface (e.g., using a DOM API) while the document is still being loaded into memory, thus reducing document access latency. Coding of clients can be made simpler by making asynchronous loading and accessing of a document transparent to the client. Additionally, a client can send notifications of completion to avoid the need to hold the entire document in memory, thus saving memory space, or the random access interface can load and unload portions of the document dynamically. Thus, a document can be accessed using a document object model interface before the entire document is parsed and, potentially, without ever holding the entire document in memory. In a multi-processor system, one processor can perform document loading and another processor can perform document access, thus resulting in additional performance advantages.

Details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

The systems and techniques described here relate to asynchronous loading and accessing of structured data, for example, providing a tree data structure interface to an entire document before the entire document has been parsed. Portions of the description that follow discuss data access in the context of XML documents, but apply equally in other contexts.

As used herein, the term "software program" means a collection of computing operations embodied by a set of instructions (e.g., one or more binary objects, one or more scripts, and/or one or more interpretable programs). The term "component" means a software program, or part of a software program, designed to operate with other components and/or application(s). The term "process" means one or more executing software programs, which may or may not share resources and/or an execution context. The term "execution context" means a set of processing cycles given to one or more processes, such as a task in a multitasking operating system.

Both an invoked application and an invoked component can each be a separate process, even if their functionality is interrelated and they share a single execution context and a single set of resources. In contrast, multiple invoked components can be a single process given multiple execution contexts (e.g., multiple threads of a single program) or multiple sets of resources (e.g., two interrelated programs that communicate with each other). The term "thread" means a component that shares resources but is given its own execution context.

The term "document" means a set of electronic data, including both electronic data stored in a file and electronic data received over a network, and including data languages representing pages of a written work (e.g., a data repository encoding an electronic book or an electronic encyclopedia) or other data languages (e.g., a data repository encoding accounting data, Web viewing data, scientific data, or other data sets). An electronic document does not necessarily correspond to a file. A document may be stored in a portion of a file that holds other documents, in a single file dedicated to the document in question, or in a set of coordinated files.

The term "text" means character data encoded using any standardized character encoding scheme, such as Unicode or ASCII. The term "logical" means conceptually faithful to a particular design or idea, despite variations in implementation. Thus, a logical tree data structure includes any data structure organized into nodes in a hierarchical set of parent-child relationships, where each node has only one parent node, except a root node, which has no parent.

Figure 1A:
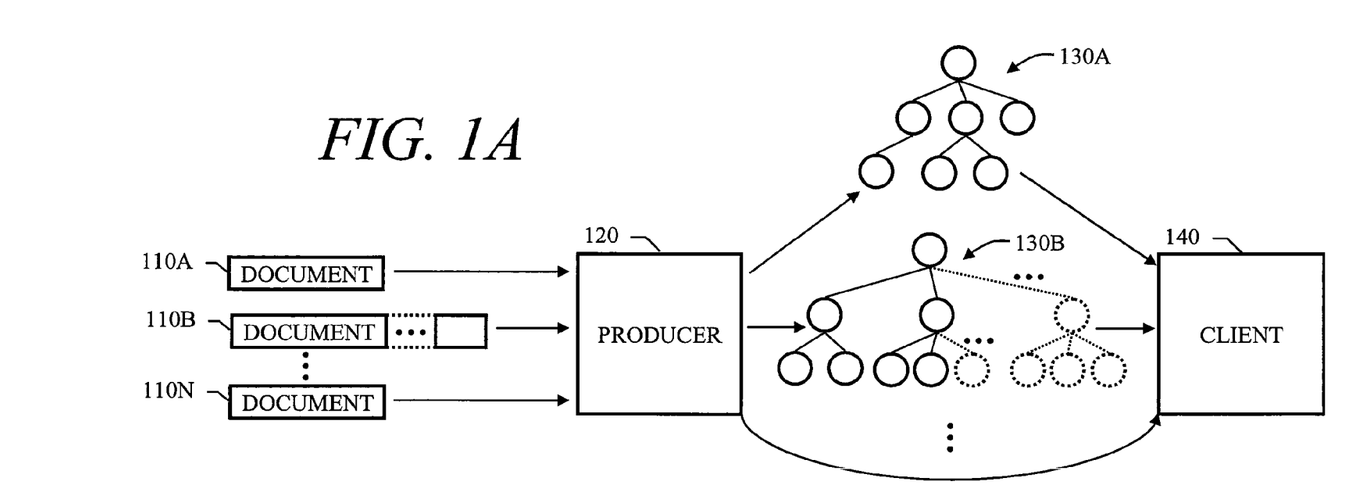
FIG. 1A is a block diagram illustrating a producer providing asynchronous document load and access services to a client.

FIG. 1A is a block diagram illustrating a producer 120 providing asynchronous document load and access services to a client 140. The producer 120 loads documents 110A, 110B-110N (documents 110) into memory from a source, and generates data structures 130A, 130B-130N (data structures 130). The source can be a file stored on a machine-readable medium, a network connection, or other source. The documents 110 include structured data, and the data structures 130 can be tree data structures (i.e., logical tree data structures), which can be generated in depth-first order, breadth-first order, or another order. The producer 120 also provides an interface to the client 140, and the interface makes the structured data of the documents 110 available to the client 140 by allowing the client 140 to access the data structures 130 as data object models. This interface provides full read and write access to the data object models, independent of a current state of loading the documents 110.

Full access means that the client 140 can make any call defined by the producer 120 for accessing the data object models, and get the correct result. These defined calls can include functions for traversing the data structures 130, querying and modifying the nodes of the data structures 130, inserting and deleting nodes, and converting the data structures 130 back into a format of the documents 110.

If a document 110A is relatively short, the full document 110A can be loaded as a data structure 130A before the client 140 attempts an access. When the client 140 requests access to the data structure 130A, the client 140 has immediate read-write random access. In contrast, if a document 110B is relatively large, the document 110A may still be loading as a data structure 130B when the client 140 attempts an access. The interface provided by the producer 120 allows the client 140 to request access to any portion of the full data structure 130B, while loading continues, thus the data object model is considered fully loaded even while actual loading of the data is ongoing. If the client 140 requests access to a portion that has not been loaded yet, the producer 120 withholds a response to the requested access until the requested portion has been loaded or until the requested portion has been determined not to exist. Thus, the client 140 has effective read-write random access to the entire document 110B as represented in the data structure 130B (i.e., the nodes of the data structure 130B can be traversed repeatedly, and in any sequence), even though the document 110B is not fully loaded into memory.

Figure 1B:
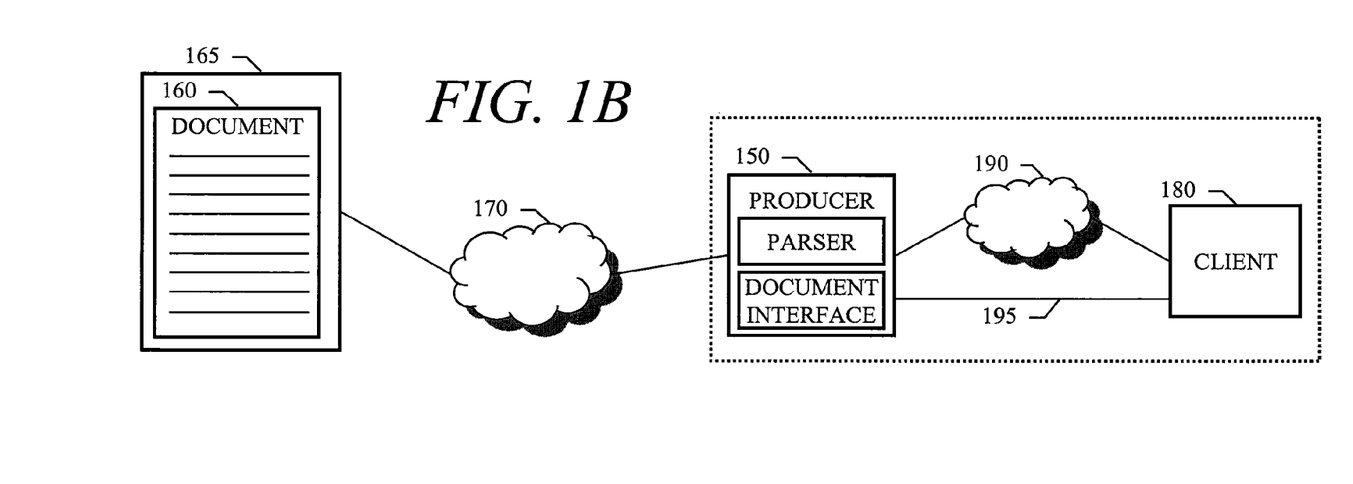
FIG. 1B is a block diagram illustrating example operational environments for the producer and the client of FIG. 1A.

As mentioned, the source of a document can be a file stored on a machine-readable medium, a network connection, or another source. FIG. 1B is a block diagram illustrating example operational environments for the producer and the client of FIG. 1A. A producer 150 includes a parsing component and a document interface component. These components can be implemented as separate threads of a producer software program. The parsing component of the producer 150 receives a document 160 from a machine 165 over a network 170 (e.g., the Internet).

The document interface component of the producer 150 provides random access, to the complete document 160, to a client 180 over a network 190 (e.g., a local area network (LAN)) while parsing of the document 160 continues. Alternatively, the producer 150 and the client 180 can be part of a single computing system, and the producer 150 can provide the document access to the client 180 through a communication connection 195 (e.g., a parallel or serial bus, inter-thread messaging, shared memory, a stack, a heap, etc.). Thus, the producer 150 and the client 180 can be separate machines, separate components in separate machines or in a single machine, or separate threads of a single software program.

Again referring to FIG. 1A, the asynchronous loading and access to the document 110B can be made transparent to the client 140 (i.e., the client 140 is unaware that loading and accessing are occurring asynchronously and simultaneously). Thus, creating the client 140 is made easier while asynchronous access is provided. The client 140 can access unloaded portions of the document without generating synchronization errors. Additionally, the client 140 can communicate with the producer 120 concerning the client's state of processing to enable additional improvements and efficiencies. For example, the client 140 can send a notification to the producer 120 when the client 140 is finished with a portion of a document. This notification indicates that no further access to this portion of the document is to be requested by the client 140, thus allowing the producer 120 to delete a portion of the data structure corresponding to the portion of the document in response to the notification. This deletion, or unloading of the document, can be performed in parallel with the loading of the document such that it is never necessary to hold the entire document in memory. In effect, the document is streamed through memory, although to the client 140, the document appears to be fully loaded in memory the entire time.

Moreover, the producer 120 can unload portions of the document, and then subsequently reload them, without notification from or awareness by the client 140. This can allow the producer 120 to effect more efficient memory usage in certain implementations, while still employing the asynchronous and simultaneous loading and accessing.

The documents 110 include structured data, such as text-based linearized tree data. For example, the documents 110 can be XML documents (e.g., documents that conform to version 1.0 of the Extensible Markup Language specification). XML is an example of a metalanguage that includes rules defining text-based formatting information (e.g., angle brackets and slashes) used to specify tags defining the semantic value of data in a document. The tags delineate elements and attributes in an XML document. Each element represents a node in the tree hierarchy that is stored linearly in a file in a text-based format. Each attribute is associated with an element and represents a child node of the corresponding element node in the tree hierarchy.

Figure 2A:
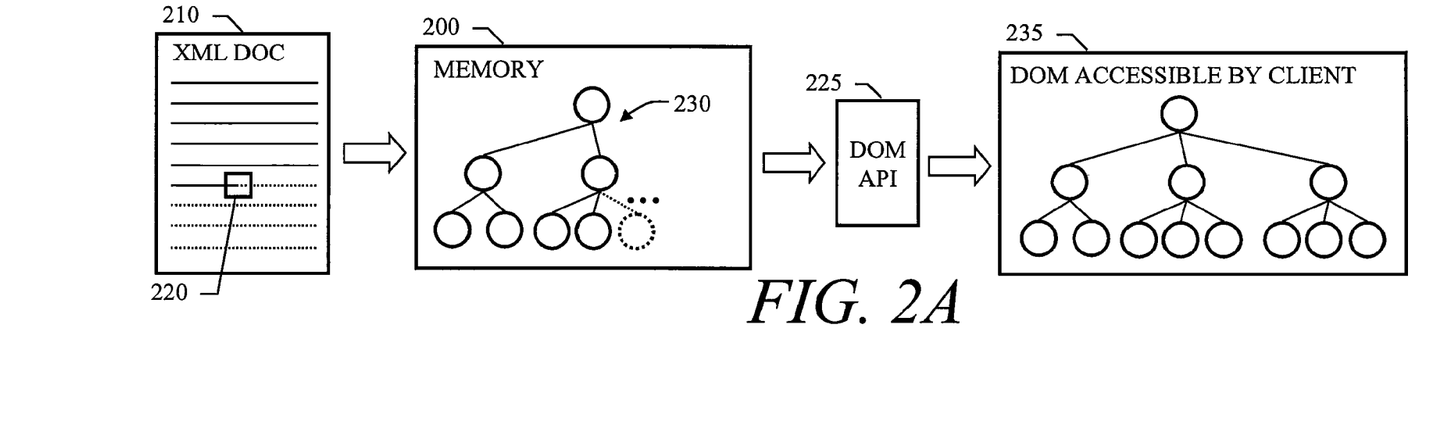
FIGS. 2A and 2B are block diagrams illustrating a parser component and an interface component of an example producer providing asynchronous document load and access services to a client.
Figure 2B:
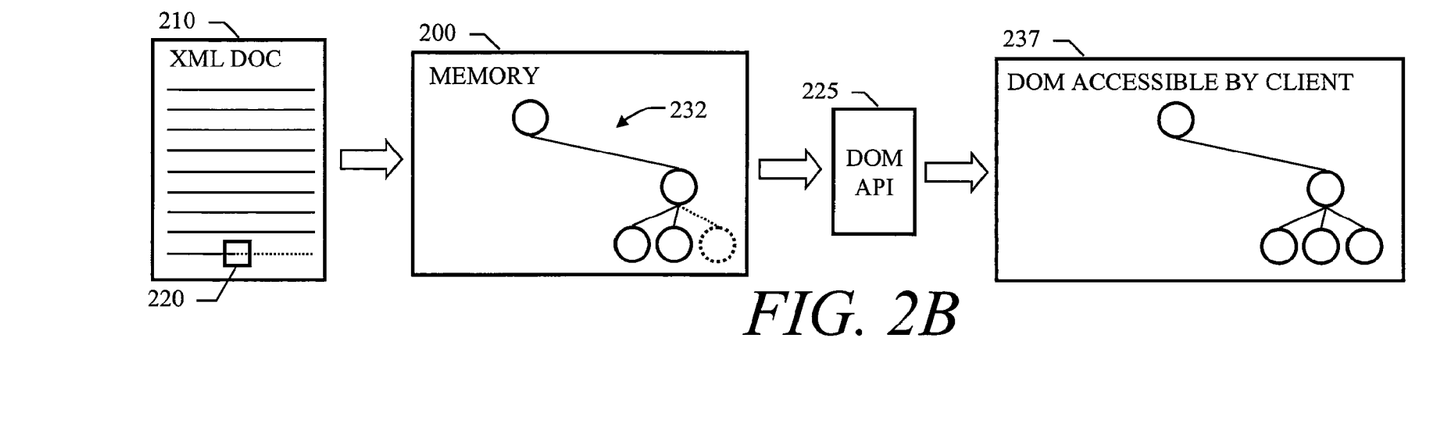

FIGS. 2A and 2B are block diagrams illustrating a parser component 220 and an interface component 225 of an example producer providing asynchronous document load and access services to a client. An XML document 210 is parsed by the parser 220 to produce a document object model (DOM) 230 in a memory 200. The DOM 230 reflects the structure of the XML document 210 (e.g., chapters, paragraphs, lines, and/or sub-parts of other data languages). The DOM 230 is produced as the parser 220 moves through the XML document 210, and the DOM 230 can conform to a DOM specification defined by the W3C.

The interface 225 is a DOM API that keeps track of the current state of parsing and provides read and write random access to the XML document 210 through the DOM 230 in the memory 200 before parsing of the XML document 210 is complete. An accessible DOM 235 includes all the nodes that can be produced once the XML document 210 has been fully parsed. If a client requests a portion of the DOM 230 that does not yet exist, the DOM API 225 recognizes this and blocks the client from further processing by waiting to provide the requested access until the requested portion is available or determined non-existent. Thus, very large XML documents can be fully accessed (both read and write access) using a DOM interface without having to wait for the XML document to fully load.

If the client knows that it has finished working with a certain portion of the DOM 230, the client can notify the DOM API 225 of this state of processing, allowing the DOM API to remove a portion of the DOM 230 from the memory 200. For example, FIG. 2B shows the result of the client notifying the DOM API 225 that the first two sub-trees of the DOM 230 are no longer needed. These two sub-trees have been removed from the DOM 230, resulting in a reduced DOM 232. An accessible DOM 237 now excludes these removed sub-trees, but still includes the remaining nodes corresponding to both parsed and unparsed portions of the XML document 210.

Figure 3A:
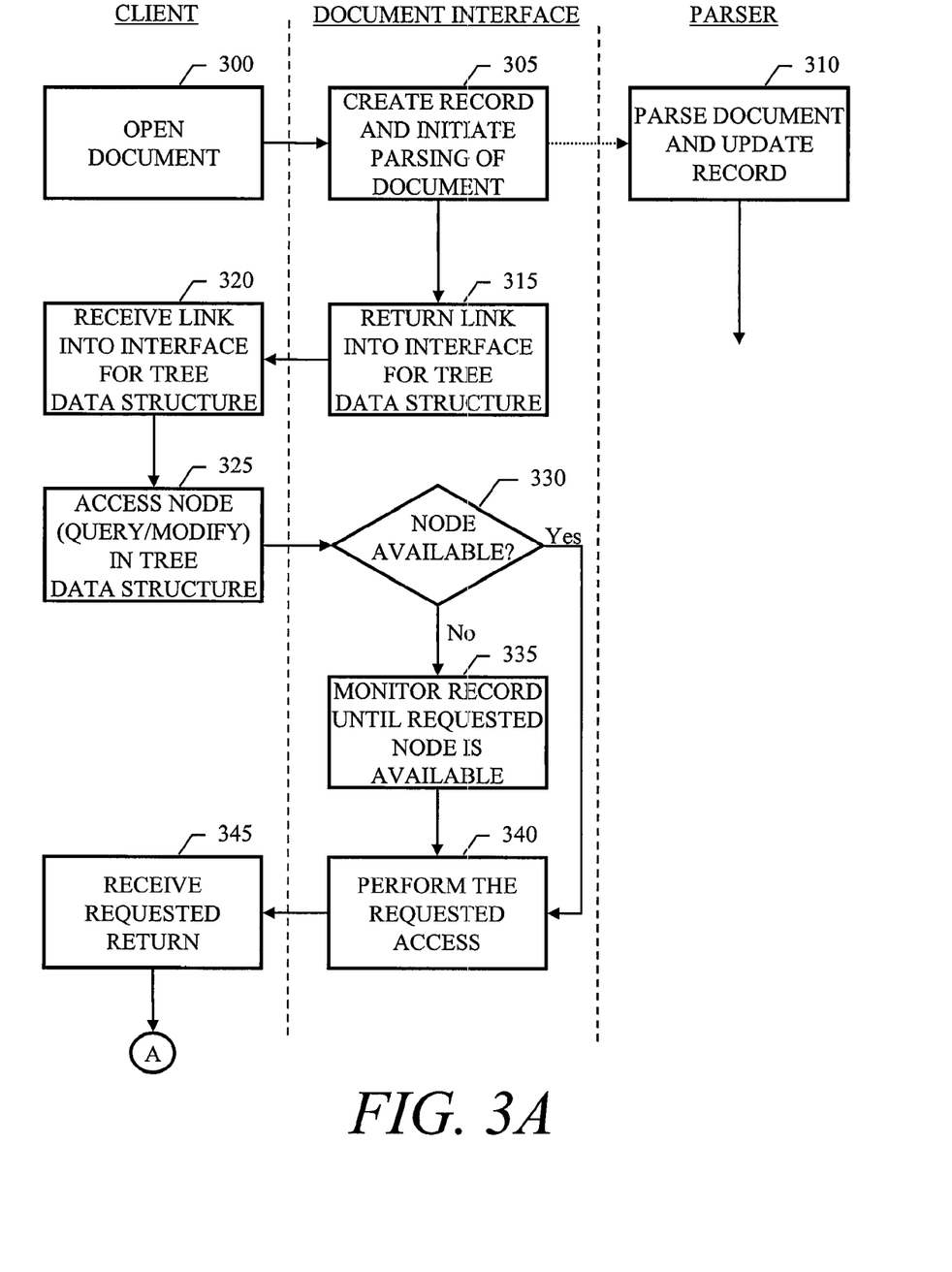
FIGS. 3A and 3B are a flow chart illustrating a method of providing asynchronous document load and access services.
Figure 3B:
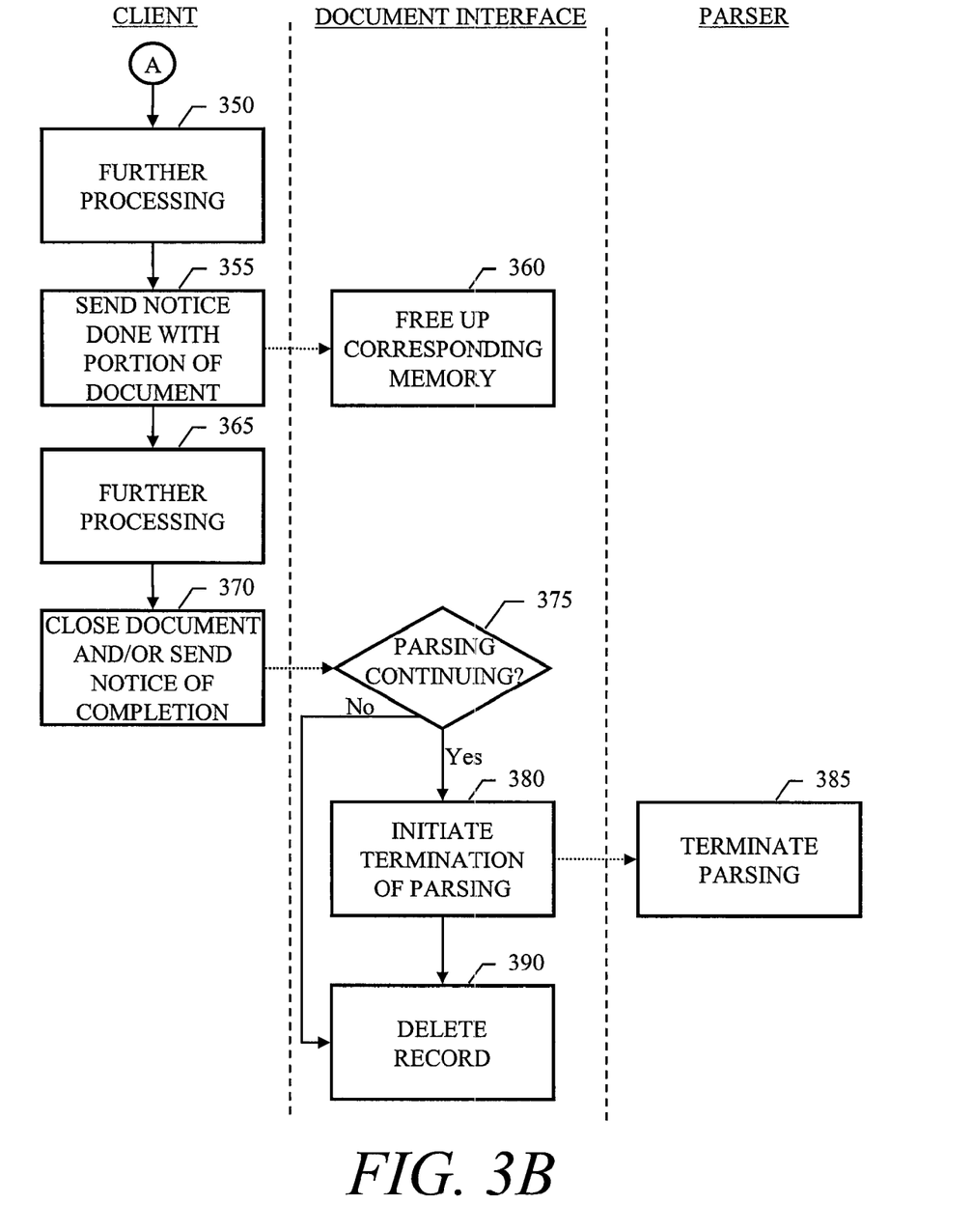

FIGS. 3A and 3B are a flow chart illustrating a method of providing asynchronous document load and access services. The method is illustrated using three interacting software components: a client, a document interface and a parser. As shown in FIG. 3A, the method begins when the client opens a document using the document interface (300). The document interface creates a record for the opened document and initiates parsing of the document to produce a tree data structure (i.e., a logical tree data structure) representing the document (305). The record is used to keep track of the current state of parsing the document and thus represents parsing-state information generally. The record can be used by the document interface alone or can be shared with the parser.

Initiation of parsing can include sending a message to the parser or spinning off a new thread to create the parser. The parser obtains the document (e.g., accesses the document on a machine-readable medium or receives the document over a network connection), begins serially parsing the document and updates the record (310). Updating of the record can involve sending parsing-state information to the document interface or directly accessing the record. Serially parsing involves parsing the document in sequence from beginning to end.

After initiation of parsing, the document interface returns a link into the interface for the tree data structure being created (315). For example, this interface link can be a variable representing the entire tree data structure with defined procedures for accessing the variable (i.e., traversing, reading and modifying the nodes of the tree). The client then receives this interface link (320). The order of the method described above can be changed as well. For example, the interface link into the tree data structure can be created by the client first (e.g., declare a new XML document object), and then the document can be opened using the interface link and the document interface (e.g., call a load procedure on the newly created XML document object).

Next, the client requests access to a node in the tree data structure, such as by querying or modifying a node (325). The document interface checks the record of parsing state to determine if the requested node is available (330). If not, the document interface waits while parsing continues and monitors the record of parsing state until the requested node becomes available (335). When the node is available, the document interface performs the requested access and returns any requested data (340). The client receives any such requested data or just the return from the procedure call (345).

Thus, the client is blocked automatically from further processing by the document interface withholding a return from a procedure call. The client can immediately begin processing the document using the document interface without having to wait for the entire document to parse and load. The client can traverse the nodes of the tree data structure in any order, but if the order is mostly in linear sequence with respect to the loading document, substantial processing efficiencies can be realized within the context of a random access interface.

As shown in FIG. 3B, the client proceeds with further processing (350). If the client determines at a later point that the client will no longer be using a portion of the document, the client can send a notice of this to the document interface (355). This notice can specify entire sub-trees, which can be very large, allowing the document interface to free up corresponding memory holding the specified portion of the tree data structure (360). This freeing up of memory can be performed in a separate component initiated by the document interface or by the document interface itself. If data in the portion has been modified, this portion can be written back into the document or into a new document. In addition, if the client specifies a portion of the document that has not been fully parsed, the document interface can cause the parser to skip this portion of the document.

After specifying one or more such portions of the document, the client can continue processing other portions of the document (365). When the client is finished with the document, the client can close the document and/or send notice of the completion, such as by de-allocating the variable created to hold the tree data structure (370). The document interface checks if parsing is still continuing (375). If so, the document interface initiates termination of the parsing (380), such as by terminating the parser thread or sending a notice to the parser to terminate parsing (385). If data has been modified, this data can be written back into the document or into a new document. Finally, the document interface deletes the record of parsing state for the closed document (390).

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results.

What is claimed is:

1. A computer-implemented method comprising:
receiving, concurrently with parsing a structured document, a request from a client to access data in the structured document while the parsing by a computing device is performed serially from a beginning to an end of the structured document, and producing a data object in a memory which is tree-structured and changes as the parsing progresses;
in response to the request, and while the structured document is being parsed, determining that the data is not yet available in a portion of the data object by ascertaining a state of the parsing; and
when the data becomes available in the data object, and before the parsing has completed, performing the requested access on the portion of the data object, returning any requested data to the client, and deleting the portion of the data object as parsing progresses.

2. The method of claim 1 where the request is initiated through a document object model interface.

3. The method of claim 1 where the data object comprises a document object model representing a tree data structure.

4. The method of claim 3 where the requested data is a node in the tree data structure.

5. The method of claim 1, further comprising causing the client to wait until the data is available in the data object.

6. The method of claim 1 where the access is one of read access or write access.

7. The method of claim 1 where the parsing is performed by one or more first threads asynchronously from one or more second threads of the client.

8. The method of claim 1, further comprising:
receiving a notification from the client, before completion of the parsing, that no further access to the data is required and removing the data from the data object in response thereto.

9. The method of claim 1, further comprising:
responsive to receiving an additional request from the client to access the portion of the data object that has been deleted, reloading the portion of the data object to perform the requested access by the client.

10. The method of claim 1, where the deleting is performed by the document object model interface.

11. A computer program product, encoded on a computer-readable storage device, executable by one or more processors to perform:
receiving, concurrently with parsing a structured document, a request from a client to access data in the structured document while the parsing by a computing device is performed serially from a beginning to an end of the structured document, and producing a data object in a memory which is tree-structured and changes as the parsing progresses;
in response to the request, and while the structured document is being parsed, determining that the data is not yet available in a portion of the data object by ascertaining a state of the parsing; and
when the data becomes available in the data object, and before the parsing has completed, performing the requested access on the portion of the data object, returning any requested data to the client, and deleting the portion of the data object as parsing progresses.

12. The program product of claim 11 where the request is initiated through a document object model interface, and where the data object comprises a document object model.

13. The program product of claim 11 where the data object comprises a document object model representing a tree data structure, and where the requested data is a node in the tree data structure.

14. The program product of claim 11, further executable to perform:
causing the client to wait until the data is available in the data object.

15. The program product of claim 11 where the access is one of read access or write access.

16. The program product of claim 11 where the parsing is performed by one or more first threads asynchronously from one or more second threads of the client.

17. The program product of claim 11, further executable to perform:
receiving a notification from the client, before completion of the parsing, that no further access to the data is required and removing the data from the data object in response thereto.

18. A system comprising:
a computer readable medium including a program product; and
one or more processors configured to execute the program product to perform:
receiving, concurrently with parsing a structured document, a request from a client to access data in the structured document while the parsing by a computing device is performed serially from a beginning to an end of the structured document, the parsing and producing a data object in a memory which is tree-structured and changes as the parsing progresses;
in response to the request, and while the structured document is being parsed, determining that the data is not yet available in a portion of the data object by ascertaining a state of the parsing; and
when the data becomes available in the data object, and before the parsing has completed, performing the requested access on the portion of the data object, returning any requested data to the client, and deleting the portion of the data object as parsing progresses.

19. The system of claim 18 where the request is initiated through a document object model interface, and where the data object comprises a document object model.

20. The system of claim 18 where the data object comprises a document object model representing a tree data structure, and where the requested data is a node in the tree data structure.

21. The system of claim 18 where the operations further comprise causing the client to wait until the data is available in the data object.

22. The system of claim 18 where the access is one of read access or write access.

23. The system of claim 18 where the parsing is performed by one or more first threads asynchronously from one or more second threads of the client.

24. The system of claim 18, the program product further executable to perform:
receiving a notification from the client, before completion of the parsing, that no further access to the data is required and removing the data from the data object in response thereto.

25. The system of claim 18 where the one or more processors comprise a server operable to interact with the client through a data communication network.

* * * * *

UNITED STATES PATENT AND TRADEMARK OFFICE
CERTIFICATE OF CORRECTION

| | | |
|---|---|---|
| PATENT NO. | : 8,667,390 B2 | Page 1 of 1 |
| APPLICATION NO. | : 12/243907 | |
| DATED | : March 4, 2014 | |
| INVENTOR(S) | : Oliver Goldman | |

It is certified that error appears in the above-identified patent and that said Letters Patent is hereby corrected as shown below:

In the Claims

Column 10, Line 32, Claim 18, after "...structured document," delete "the parsing", therefor.

Signed and Sealed this
Twenty-fourth Day of June, 2014

Michelle K. Lee
*Deputy Director of the United States Patent and Trademark Office*